(12) United States Patent
Provost et al.

(10) Patent No.: US 7,286,817 B2
(45) Date of Patent: Oct. 23, 2007

(54) SYSTEM FOR ACKNOWLEDGING A MESSAGE RECEIVED ON A MOBILE TERMINAL

(75) Inventors: Hervé Provost, Seyssinet-Pariset (FR); David Picquenot, Saint Contest (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/275,359

(22) PCT Filed: Apr. 26, 2001

(86) PCT No.: PCT/FR01/01285

§ 371 (c)(1),
(2), (4) Date: May 6, 2003

(87) PCT Pub. No.: WO01/86978

PCT Pub. Date: Nov. 15, 2001

(65) Prior Publication Data

US 2004/0203948 A1  Oct. 14, 2004

(30) Foreign Application Priority Data

May 9, 2000 (FR) .................................. 00 05890
Jul. 7, 2000 (FR) .................................. 00 08874

(51) Int. Cl.
*H04Q 7/20* (2006.01)
(52) U.S. Cl. .............................. 455/412.1; 455/414.1; 455/466
(58) Field of Classification Search ............. 455/414.1, 455/414.2, 466, 566
See application file for complete search history.

(56) References Cited

U.S. PATENT DOCUMENTS

| | | | | |
|---|---|---|---|---|
| 5,153,582 A | * | 10/1992 | Davis | 340/7.23 |
| 5,692,032 A | * | 11/1997 | Seppanen et al. | 455/466 |
| 5,821,874 A | * | 10/1998 | Parvulescu et al. | 340/7.53 |
| 5,845,202 A | * | 12/1998 | Davis | 455/412.2 |
| 5,870,030 A | * | 2/1999 | DeLuca et al. | 340/7.48 |
| 5,875,403 A | * | 2/1999 | Christal | 455/566 |
| 5,930,239 A | * | 7/1999 | Turcotte | 370/310 |
| 5,940,740 A | * | 8/1999 | Aas et al. | 340/7.22 |
| 6,085,100 A | * | 7/2000 | Tarnanen | 455/466 |
| 6,151,507 A | * | 11/2000 | Laiho et al. | 455/466 |
| 6,219,542 B1 | * | 4/2001 | Aas et al. | 455/412.1 |

(Continued)

FOREIGN PATENT DOCUMENTS

WO   WO95 12933   5/1995

OTHER PUBLICATIONS

"Digital Cellular Telecommunications System (Phase 2+) Technical Realization of the Short Message Service (SMS)", Dec. 1999, pp. 1-121.

*Primary Examiner*—Jean Gelin
(74) *Attorney, Agent, or Firm*—Cohen Pontani Lieberman & Pavane LLP

(57) ABSTRACT

A system for acknowledging that a message sent by a sender terminal and received on a destination mobile terminal has been read. The sender terminal comprises a module for: a) supplying the identifier of a destination mobile terminal for the message; b) generating the text of the message to be sent; and c) specifying a method of returning the read acknowledgment, accompanied by an associated identifier. The mobile terminal comprises a module for: displaying the message sent by the sender terminal, and for sending a read acknowledgment using the specified method of return.

8 Claims, 1 Drawing Sheet

U.S. PATENT DOCUMENTS

| | | | |
|---|---|---|---|
| 6,230,019 B1 * | 5/2001 | Lee | 455/466 |
| 6,480,712 B1 * | 11/2002 | Vigil | 455/412.2 |
| 6,665,531 B1 * | 12/2003 | Soderbacka et al. | 340/7.21 |
| 6,684,068 B1 * | 1/2004 | Tikka et al. | 455/412.1 |
| 6,731,942 B1 * | 5/2004 | Nageli | 455/458 |
| 6,775,359 B1 * | 8/2004 | Ron et al. | 379/88.14 |
| 6,826,407 B1 * | 11/2004 | Helferich | 455/466 |
| 6,915,332 B1 * | 7/2005 | Zdepski | 709/206 |
| 6,925,308 B2 * | 8/2005 | Goldsmith et al. | 455/466 |
| 6,928,290 B2 * | 8/2005 | Byers et al. | 455/455 |

* cited by examiner

SYSTEM FOR ACKNOWLEDGING A MESSAGE RECEIVED ON A MOBILE TERMINAL

FIELD OF THE INVENTION

This application is a U.S. National Phase Application under 35 USC 371 of International Application PCT/FR01/01285 filed Apr. 26, 2001.

The present invention relates to a read acknowledgment system for acknowledging that a message sent from a transmitter terminal and received on a destination mobile terminal has actually been read.

The invention applies in particular to the field of mobile telephony (GSM, GPRS, UMTS, etc.), and more particularly to telecommunications services for which the sender of a message seeks to have acknowledgment that the message has been read, or acknowledgment that it has merely been received, to be returned by the addressee of the message from the destination mobile terminal.

DESCRIPTION OF THE RELATED ART

At present, there exist various services that propose sending messages to mobile terminals. By way of example, these terminals can be pagers or GSM terminals handling the short-message service (SMS). Access can be made to the service via various means: Minitel, Web navigator, electronic mail, via a call center, etc.

Nevertheless, those services provide no guarantee that the message received on a mobile terminal has actually been read, nor even that a message has at least been received by said mobile terminal.

The present invention provides a read acknowledgment system for acknowledging that a message sent by a sender terminal and received by a destination mobile terminal has actually been read. This allows the sender of a message to be certain that the message has been read at the remote mobile terminal, and as a subsidiary matter that the message has at least been received, thus making it possible for the message recipient to respond to the reading of the message by sending another message or a voice call.

According to the present invention, the solution to the technical problem posed consists in that:
 said sender terminal comprises means for:
  providing an identifier of the destination mobile terminal for the message;
  generating the text of the message to be sent; and
  indicating the method whereby read acknowledgment should be returned, accompanied by an associated identifier; and
 said mobile terminal comprises means for:
  displaying the message sent by the sender terminal; and
  sending a read acknowledgment using the specified method of return.

Access to the acknowledgment system in accordance with the present invention is thus made by three functional categories of terminal:
 one category for sending messages, i.e. the sending terminal;
 another category, i.e. the mobile terminal, equipped to receive messages, to process messages, and to return an acknowledgment for each message received; and
 finally the last category enabling acknowledgments to be received, which category can physically be the same as the sending terminal used for sending the message.

When a Web navigator is used for sending the initial message, the sender connects a terminal to a Web server reserved for the acknowledgment service and is then offered control elements for receiving the following items:
 a) the identifier (number) of the mobile terminal to which the message is to be sent;
 b) the text of the message to be sent;
 c) selecting the way in which the acknowledgment is to be returned, as an electronic message in the form of a text (e.g. e-mail, SMS message), or a message generated by voice synthesis (telephone);
 d) the identifier corresponding to the selection made in c) to which the acknowledgment should be sent by said electronic message in the form of text or said message generated by voice synthesis, such as:
  an e-mail address for e-mail;
  a GSM or other number for SMS messages; or
  a GSM, PSTN, ISDN, etc. telephone number for voice synthesis;
 e) optionally, the identifier of telecommunications means where the sender of the message can be reached (GSM, PSTN, ISDN etc. number); and
 f) also optionally, a request for an acknowledgment that the message has been received to be sent by said method of returning read acknowledgment (acknowledgment of receipt returning to the sender by the same path as read acknowledgment).

By way of example, pressing a button available on the interface serves to confirm and send the message over the telecommunications network to the destination mobile terminal.

When a single message is sent to a plurality of destination mobile terminals, a control element may accept a plurality of identifiers (numbers), with the same message being sent to each of the specified mobile terminals. Acknowledgment is performed as though the messages had been sent one by one, i.e. there should be as many acknowledgments as there are identifiers.

In order to increase the effectiveness with which a message is sent, and if possible in the Web navigator, additional control elements are provided which contain default values as implemented from a prior time that additional control elements were used.

At the message receiving end, the mobile terminal may vibrate or ring as a function of its facilities and of the user's preferences. By way of example, the signal is activated on receiving an SMS message on GSM. Depending on the particular mobile terminal, it is possible either to read the message immediately (message is already displayed on the screen), or else after performing some action specific to using the terminal.

Displaying a message corresponds to implementing a first interface giving the message addressee two choices:
 1) sending the acknowledgment that the message has been read to the originating terminal; or
 2) sending a voice call to the sender of the message.

After sending the acknowledgment (choice 1) or after making a voice call (choice 2), a second interface gives the addressee two new choices:
 1) archiving the message; and
 2) deleting the message.

After choice (1) or (2) has been made by the second interface, the mobile terminal returns to its prior state, i.e. to its state prior to receiving the initial message.

If another message arrives, the preceding message is archived, and it is the new message which is presented on the first interface if the terminal displays messages immediately.

If a message is archived and is then called up again on the screen of the mobile terminal, the total number of choices available from the first and second interfaces are again proposed to the user, with the exception of choice (1) of the first interface if the message has already been properly acknowledged.

It should be observed that the interface choices may be made by pressing on a button or by issuing instructions for voice recognition.

For example, acknowledgments are received via conventional methods such as consulting e-mail, telephone calls, consulting messages on a network answering service (e.g. "Top Message").

Various options are possible:

Option 1: the addressee of the initial message can use the mobile terminal to call a call center and dictate the items needed for the acknowledgment.

Option 2: acknowledgment can return in the form of a voice-synthesized message left on a network answering service (e.g. "Top Message"), or a message which is read out when the number left under a control (element (e) in FIG. 1) is taken off-hook.

Option 3: an acknowledgment that the message has been received, but not read on the mobile terminal may be returned systematically over the same channel as the acknowledgment that the message has been read.

A scenario for use of the acknowledgment system of the invention is described below in the context of health care, and more precisely for traveling nurses, working in the context of a home hospitalization service, e.g. traveling from one home to another by car.

On receiving information concerning a patient, or if it becomes necessary to change scheduling at the last minute, possibly associated with synchronizing patient care, the service manager decides to inform the nurse in question, presently visiting patients, it being assumed that the nurse possesses a GSM mobile terminal which displays received SMS messages directly.

The manager connects to the Web service providing acknowledgment in accordance with the invention and fills in the following control elements:

a) number of the nurse's GMS terminal;
b) text of the message to be sent;
c) selected method of returning the acknowledgment, with there being three possible variants:
  variant 1:
  d) e-mail address of the manager (already filled in during earlier use);
  variant 2:
  d) the telephone number of the manager's extension which may benefit from a network answering service of the "Top Message" type (already filled in during earlier use);
  variant 3:
  d) the manager's GSM telephone number (already filled in during earlier use);
e) the telephone number of the manager's extension (already filled in during earlier use), for a direct telephone call; and
f) the manager decides not to check the option requesting mere acknowledgment of receipt of the message.

The manager sends the message and the message is received a short time later in the nurse's GSM terminal.

If the nurse's GSM terminal is busy, the network will make attempts at regular intervals to send a message. If, after a certain length of time or after some number of attempts, it has not been possible to send the message all the way to the nurse's GSM terminal, then the network sends a message back to the manager over the path specified for the read acknowledgment, informing the manager that the message has not even been delivered.

The nurse will have taken the precaution to put the terminal on the "vibrate" option when it receives SMS messages so as to remain discrete with respect to a patient, should the nurse be carrying out home care. When back in the car or at a time that is convenient in the patient's home, the nurse looks at the GSM terminal which displays the message sent by the manager.

Depending on the content of the message, the nurse can either call the manager's extension directly, or can merely acknowledge that the received message has been read. Once one of those two actions has been performed, the nurse decides to delete the message.

If the nurse's GSM terminal is disconnected from the network (which is unlikely assuming the nurse has just received the message), then the terminal waits until contact is reestablished in order to send the acknowledgment, and the GSM terminal then informs the nurse.

If the nurse's GSM terminal cannot communicate with the network because the network is overloaded, then it makes attempts at regular intervals to send the acknowledgment. If after a certain length of time or a certain number of attempts the terminal has not managed to send the acknowledgment, its interface informs the nurse of this failure.

Variant 1: if the manager's electronic mail server is unavailable (saturation, breakdown, etc.) or if the e-mail address is wrong, then the network makes another attempt at sending the acknowledgment in the form of e-mail. If, after a certain length of time or after a certain number of attempts, it has not been possible to deliver the acknowledgment message to the manager's server, then a conventional SMS message is sent to the nurse reporting this failure.

The service handling the manager's e-mail is permanently connected. Thus, as soon as the arrival of a message on the e-mail server is notified, the acknowledgment message is loaded into the terminal. Once the manager has become aware of the acknowledgment message, she is certain that the initial message has been read.

Variant 2: the server for receiving read acknowledgments from the GSM system generates a voice message and then calls the number specified by the manager. If the manager (or her personal answering service) answers the call, then the message is read n times in a loop as from answering (and if after n times the manager has not hung up, the server hangs up).

If the manager is already on a call or if she does not answer and if she subscribes to a "Top Message" type answering service on the network, then the synthesized voice message is left on the "Top Message" service.

If the manager is already on a call or does not answer and is not a subscriber to a "Top Message" service, then the server calls again a certain number of times.

If, after a certain length of time or a certain number of attempts, it has not been possible to deliver the acknowledgment, then a conventional SMS message is sent to the nurse concerning this failure.

As soon as the manager answers, or listens to her personal answering service, or interrogates "Top Message", she knows that her initial message has been read.

Variant 3: the server receiving read acknowledgments from the nurse's GSM terminal generates a new SMS message for the manager's GSM terminal. As in the preceding variant, if, after a certain length of time or after a certain number of attempts, it has not been possible to send the new SMS message to the manager's GSM terminal, then a conventional SMS message is sent to the nurse concerning this failure.

Once the manager is aware of the SMS message that has reached her GSM terminal, she knows that the initial message has been read.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE DRAWINGS

Figure 1:
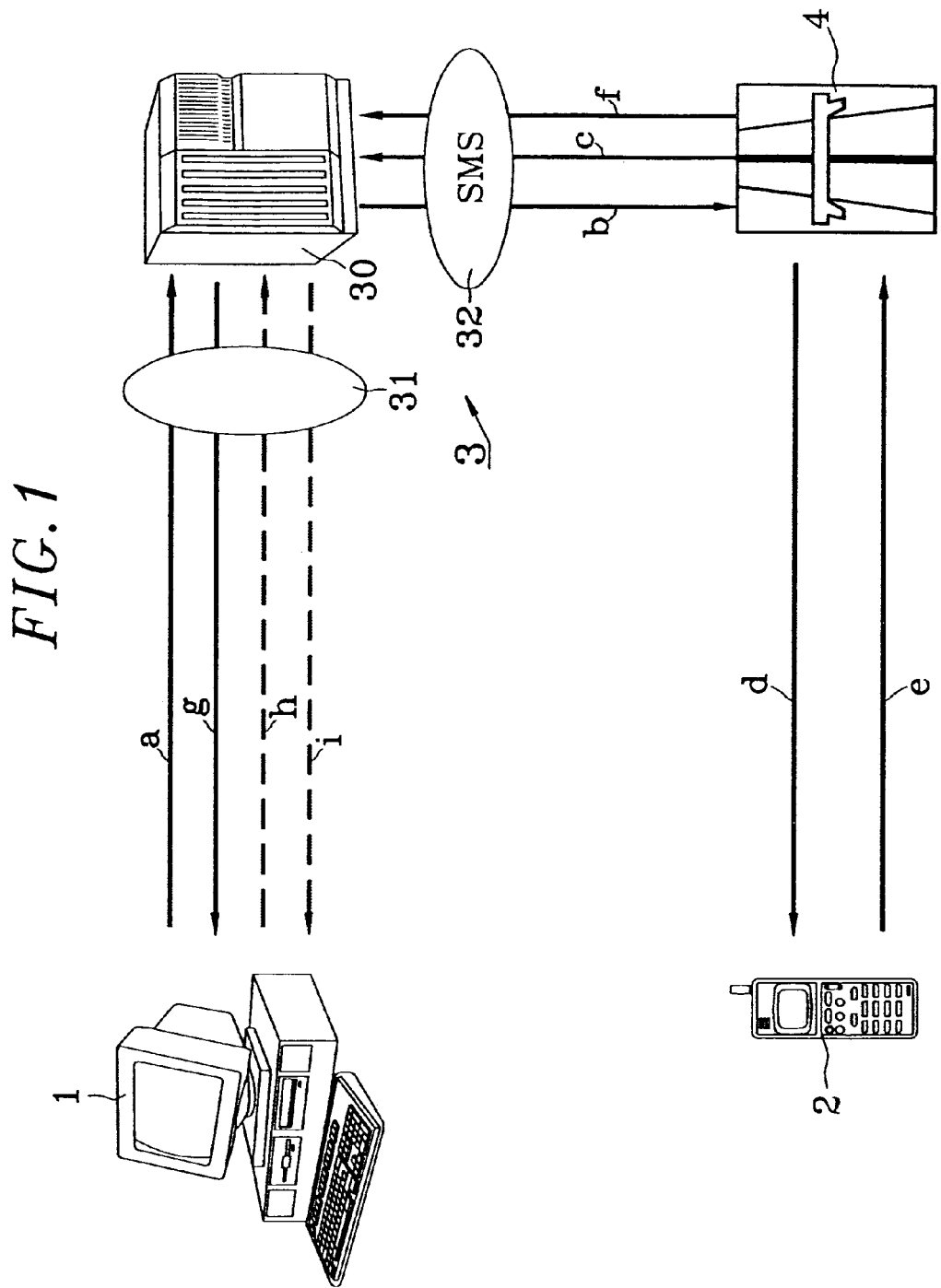
FIG. 1 is a diagram of a read acknowledgment system in accordance with the invention.

FIG. 1 shows a system for acknowledging that a message sent by a sending terminal 1 and received by a destination mobile terminal 2 has been read.

At the sending end, the system comprises, in addition to the sender of the message that is to be sent, a terminal 1 connected to the Internet and a Web navigator, an e-mail service, and a telephone terminal.

In the example of FIG. 1, at the receiving end, the system comprises, in addition to the addressee of the message, a mobile telephone 2 of the GSM type having a subscriber identification module (SIM) card. The SIM card contains an application suitable for implementing the acknowledgment system of the invention.

The connection between the sending terminal 1 and the mobile terminal 2 is established via an intermediary server 3 and an SMS-C gateway 4.

The intermediary server 3 is an application server suitable for implementing an acknowledgment system in accordance with the invention. It includes a finite-state controller in software, a Web server 30, an e-mail interface 31, and a network answering service ("Top Message"), and an interface 32 for communication with the SMC-C gateway 4.

The Web server 30 comprises HTML/javascript pages including CGI script enabling message-sending requests to be received. It is capable of generating dynamic HTML pages in order to describe the status of each message that has been sent at the request of the sender.

The e-mail interface 31 and "Top Message" enable the status of each message to be sent respectively by e-mail or by the "Top Message" service. A message may have any of the following statuses:
  not received by the addressee, GSM terminal 2 not within coverage;
  not received by the addressee, GSM terminal 2 busy;
  not received by the addressee, because of a network transmission problem;
  received by the GSM terminal 2; and
  acknowledged by the addressee.

The SMS-C gateway 4 is a GSM telecommunications gateway enabling SMS messages to be routed between applications servers, such as the intermediary server 3, and GSM terminals. It has a system for notifying reception, and more generally, it enables the applications servers to know:
  whether an SMS message has been received by a GSM terminal;
  whether the destination terminal is out of coverage;
  whether the destination terminal is busy; and
  whether an error has occurred in transmission.

The acknowledgment system of FIG. 1 operates as follows.

Using the terminal 1 connected to the Internet and its Web navigator, the person sending a message connects (a) to the Web server 30. Using a form constituted by an HTML page, the following fields are filled in:
  the identifier of the destination mobile terminal for the message, in this case the number of the GSM terminal 2;
  the text of the message to be sent;
  the way in which read acknowledgment is to be returned. In a particular implementation, return can be by e-mail. The sender of the message must then specify the associated identifier in the form, which in this case is constituted by the sender's e-mail address (assuming that this information has not already been given during earlier use);
  optionally the sender may supply the identifier of telecommunications means where the sender can be reached (assuming that this has not already been done during earlier use). This identifier is the sender's telephone number.

The sender of the message then clicks on a button for sending the form. The fields filled-in in the above manner are forwarded to the intermediary server 3 via the CGI script which sends a dynamic HTML page to the sender giving information about the status of messages that have been sent, thus enabling the sender to keep track of message progress.

Thereafter, the intermediary server 3 formats the message so that it can be sent (b) to the SMS-C gateway 4, requesting that it be notified of receipt.

Reception of the SMS message by the gateway 4 is notified (c) to the intermediary server 3. This notification is returned back to the sender of the message by dynamic HTML pages. In the event of an error in transmission, the server 3 makes attempts at regular intervals to send again. If the GSM mobile terminal 2 is out of coverage, then the server 3 request the SMS-C gateway to alert it in the event of the terminal 2 reconnecting with the network.

The SMS message is then received (d) on the mobile terminal 2 and triggers a dedicated application in its SIM card so as to display a menu on the screen of the terminal, the menu comprising the following options:
  acknowledge the message, and possibly also reply thereto in the form of a text message;
  make a voice call to the sender of the message via the sender's telephone.

The acknowledgment, optionally accompanied by a text message, is sent (e) to the gateway 4 and then (f) to the intermediary server 3, and finally (g) to the initial sender of the message using the method of return as specified initially, e.g. e-mail.

At any time, the sender of the message may act through the interface 31 to ask (h) the intermediary server 3 to provide the status of a message that has previously been sent. The various statuses are described above. The response is sent (i) in the form of an electronic message, or by "Top Message".

Thus, although the fundamental novel features of the invention as applied to a preferred embodiment thereof have been shown, described and pointed out, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for acknowledging that a message sent by a sender terminal (1) and received by a destination mobile terminal (2) has been read, the system comprising: a sender terminal and a destination mobile terminal, wherein said sender terminal (1) comprises:

means for providing an identifier of the destination mobile terminal (2) for the message;

means for generating text of the message to be sent; and means for specifying at least one parameter defining a communication method to be used for sending a read acknowledgment message; and wherein said mobile terminal (2) comprises:

means for displaying the text of the message sent by the sender terminal (1); and means for allowing a user of said destination mobile terminal (2) to acknowledge that said message has been read, causing the read acknowledgment message to be sent using said communication method specified for sending the read acknowledgment message;

wherein said at least one parameter comprises an identifier of a destination terminal for the read acknowledgement message.

2. A system according to claim 1, wherein said at least one parameter comprises an indication of a message form for said read acknowledgement message, said message form being one of a text message and a voice message generated by voice synthesis.

3. A sender terminal for implementing a read acknowledgment of a message, said sender terminal (1) comprising:

means for providing an identifier of a destination mobile terminal (2) for the message;

means for generating text of the message to be sent to said destination mobile terminal (2); and means for specifying at least one parameter defining a communication method to be used for sending a read acknowledgment message;

wherein said at least one parameter comprises an identifier of a destination terminal for the read acknowledgement message which is sent to acknowledge that said message has been read by a user of said destination mobile terminal.

4. The sender terminal of claim 3, further comprising:

means for specifying an identifier of telecommunications means via which a sender of said message from said sender terminal can be called.

5. The sender terminal of claim 3, further comprising:

means for requesting an acknowledgment of receipt of said message from said sender terminal to be sent using said communication method for sending a read acknowledgment message.

6. A mobile terminal (2) for implementing a read acknowledgement of a message, said mobile terminal comprising:

means for displaying a message sent from a sender terminal (1); and means for receiving from said sender terminal at least one parameter defining a method to be used for sending the read acknowledgement message; and means allowing a user of said mobile terminal to acknowledge that said message from the sender terminal has been read, causing the read acknowledgment message to be sent using said method;

wherein said at least one parameter comprises an identifier of a destination terminal for the read acknowledgement message.

7. The mobile terminal of claim 6, further comprising:

means for receiving an identifier of telecommunications means via which the sender of said message can be called.

8. The mobile terminal of claim 7, further comprising:

user interface means allowing the user of said mobile terminal to start a voice call with the sender of said message, said user interface being activated after reception of said message.

* * * * *